United States Patent [19]
Noll et al.

[11] Patent Number: 5,078,511
[45] Date of Patent: Jan. 7, 1992

[54] APPARATUS FOR GENERATING OPTICAL WAVES POLARIZED ORTHOGONALLY RELATIVE TO ONE ANOTHER FROM AN INCOMING OPTICAL WAVE

[75] Inventors: Bernd Noll; Uwe Eberhardt, both of Munich, Fed. Rep. of Germany

[73] Assignee: Siemens Aktiengesellschaft, Munich, Fed. Rep. of Germany

[21] Appl. No.: 585,288

[22] Filed: Sep. 14, 1990

Related U.S. Application Data

[63] Continuation of Ser. No. 383,651, Jul. 24, 1989, abandoned.

[30] Foreign Application Priority Data

Sep. 30, 1988 [DE] Fed. Rep. of Germany ....... 3833296

[51] Int. Cl.[5] ............................................. G02B 6/10
[52] U.S. Cl. ................................................... 385/3
[58] Field of Search ............................... 350/96.14

[56] References Cited

U.S. PATENT DOCUMENTS

| | | | |
|---|---|---|---|
| 4,709,978 | 12/1987 | Jackel | 350/96.14 |
| 4,758,060 | 7/1988 | Jaeger et al. | 350/96.14 |
| 4,768,848 | 9/1988 | Vaerewyck | 350/96.14 |
| 4,768,852 | 9/1988 | Ih | 350/96.14 |
| 4,776,656 | 10/1988 | Sanford et al. | 350/96.14 |
| 4,776,657 | 10/1988 | Reeder | 350/96.14 |
| 4,798,437 | 1/1989 | Rediker et al. | 350/96.14 |
| 4,832,432 | 5/1989 | Erman | 350/96.14 |
| 4,840,447 | 6/1989 | Kataoka | 350/96.14 |

OTHER PUBLICATIONS

Electronics Letters, 4th Jun. 1987, vol. 23, No. 12, pp. 614–616.

Primary Examiner—William L. Sikes
Assistant Examiner—Robert E. Wise
Attorney, Agent, or Firm—Hill, Van Santen, Steadman & Simpson

[57] ABSTRACT

An apparatus for generating optical waves which are polarized orthogonally relative to each other from an incoming optical wave for enabling polarization-independent, optical superheterodyne reception has an integrated optical Mach-Zender interferometer which is preceded by an integrated optical directional coupler or by a waveguide fork and is followed by an integrated optical directional coupler.

18 Claims, 3 Drawing Sheets

APPARATUS FOR GENERATING OPTICAL WAVES POLARIZED ORTHOGONALLY RELATIVE TO ONE ANOTHER FROM AN INCOMING OPTICAL WAVE

This is a continuation of application Ser. No. 383,651 filed 7/24/89, now abandoned.

BACKGROUND OF THE INVENTION

1. Field of the Invention

The present invention is directed to an apparatus for generating optical waves which are polarized orthogonally relative to one another from an incoming optical wave constructed in integrated optical technology.

2. Description of the Prior Art

Many alternatives are known for the realization of coherent optical communications systems. A reception system making use of a technique known as polarization quadrature reception avoids the problem of fluctuating polarization direction of the incoming signal, which is supplied by a suitable communications system link, by resolving the incoming signal into two sub-signals polarized orthogonally relative to each other, for example TE-signals and TM-signals. This is accomplished in the receiver with the sub-signals then being separately superimposed with the local oscillator signal.

Heretofore such receivers have been constructed for both free beam propagation and fiber optics beam propagation. The former has the disadvantage that a transition from a guided optical wave into a freely propagating wave is necessary. The latter involves difficulties in manufacture as well as difficulties related to the sensitivity of the component properties to temperature fluctuations or to bending of the fiber.

Previous attempts at constructing an integrated optical receiver of this type have only been generally described in the literature (see, for example, Electon. Lett. 23 (1987), pages 614–616). The polarization-dependent degree of coupling of a directional coupler is exploited in this proposal and the directional coupler is dimensioned such that, for example, the TE-polarized optical wave completely couples to a second optical waveguide of the directional coupler, whereas the TM-polarized wave remains entirely in the first waveguide of the coupler. Minute fluctuations in the manufacturing process have an unfavorable influence on the functionability of the components, and produce signal degrading crosstalk. The aforementioned proposal seeks to alleviate these problems by providing an electrode in the directional coupler to at least permit control of the coupling behavior of the TM-polarized wave. There is no possibility provided for controlling the coupling behavior of the TE-polarized wave.

SUMMARY OF THE INVENTION

It is an object of the present invention to provide an apparatus suitable for use in a receiver making use of the polarization quadrature reception technique for generating optical waves which are polarized orthogonally relative to one another from an incoming optical wave, which can be constructed with minimum demands on the components and with a high degree of reproducibility in the manufacturing process.

The above object is achieved in accordance with the principles of the present invention in an apparatus having an integrated optical Mach-Zender interferometer having two interferometer arms which respectively guide two optical waves obtained from an incoming optical wave, which are polarized orthogonally relative to each other. The two interferometer arms in combination effect a phase-shifting of each of the two polarization directions, such as the TE and TM directions. In a preferred embodiment, this is accomplished by one of the arms having TE and TM phase-shifting elements, which the other interferometer arm having no phase-shifting elements. As a result of passage through the two interferometer arms, the waves in each polarization direction will be shifted by an amount selected for each polarization direction. The phase-shifted waves in both polarization directions are coupled out of one of the interferometer arms, and the non-phase-shifted waves are coupled out of the other interferometer arm. The phase-shifted wave in one of the polarization directions can be superimposed on the non-phase-shifted wave of the same polarization direction from the other interferometer arm, and the same can be done with the phase-shifted wave of the other polarization direction and the non-phase-shifted wave of that same polarization direction from the other interferometer arm.

The interferometer arms may be in the form of an integrated optical waveguide consisting of a material having a refractive index which is variable by varying an electrical field in which the waveguide is disposed. The electrical field may have a predominant component in one direction in a first longitudinal portion of the waveguide, and a predominant component in a different direction in a second longitudinal portion of the waveguide, with each predominating field component penetrating the waveguide. The predominating components in the different directions may, for example, be in the same respective directions as the two different polarization directions. The waveguide in this embodiment may consist of electro-optic material.

An integrated optical directional coupler may be used at the input side of the apparatus having two output ports respectively coupled to the two interferometer arms. A 3 dB directional coupler may be used for this purpose.

Alternatively, an integrated optical waveguide fork may be used at the input side of the apparatus having two output ports respectively connected to the two interferometer arms.

An integrated optical directional coupler may also be used at the output side of the apparatus, having two input ports respectively connected to the two interferometer arms, and two output ports at which the optical waves polarized orthogonally relative to each other can be taken. Again, a 3 dB directional coupler may be used.

DESCRIPTION OF THE PREFERRED EMBODIMENTS

Figure 1:
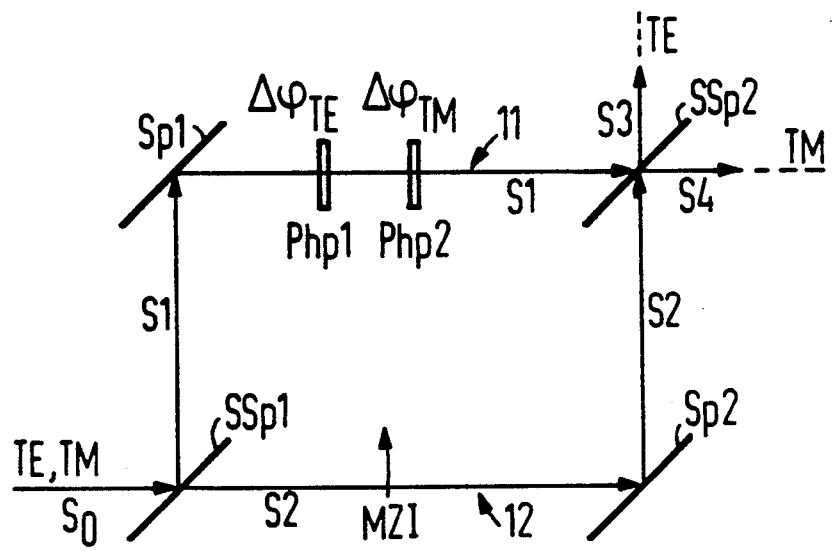
FIG. 1 is a schematic view of a classic free beam propagation Mach-Zender interferometer for explaining the principles of the present invention.

A classical structure for free beam propagation is schematically shown in FIG. 1 for explaining the principles of the invention herein. An incoming optical wave SO having components in the TE-polarization direction and in the TM-polarization direction is divided by a polarization-independent beam splitter SSp1 into two optical waves S1 and S2. The beam splitter SSp1 is preferably a 50% beam splitter. The optical waves S1 and S2 are respectively supplied to arms 11 and 12 of equal length in a Mach-Zender interferometer MZI. It is desired that the waves exiting the arms 11 and 12 be phase-shifted in both polarization directions relative to each other. This could be accomplished by having phase-shifting elements in each interferometer arm which would effect a different phase shift in each polarization direction in each of the arms. For simplicity, however, as shown in the example of FIG. 1, the arm 12 has no phase-shifting elements, and the arm 11 has a phase shifting element Php1 which effects a phase shift $\Delta\phi_{TE}$ in the TE-polarization direction relative to the wave component of that same polarization direction in the arm 12, and a phase-shifting element Php2 which effects a phase shift $\Delta\phi_{TM}$ in the TM-polarization direction relative to the component in that same polarization direction in the arm 12. When suitable values are selected for the phase differences $\Delta\phi_{TE}$ and $\Delta\phi_{TM}$, the components of the optical waves S1 and S2 having TE-polarization from the two interferometer arms 11 and 12 can be superimposed at a second polarization-independent beam splitter SSp2, and the superimposed waves emerge at one side of the beam splitter SSp2 as a wave S3 having TE-polarization. Similarly, an optical wave S4 having TM-polarization emerges at the other side of the beam splitter SSp2.

The structure of FIG. 1 includes two mirrors Sp1 and Sp2 which serve only to respectively deflect the optical waves S1 and S2 within the respective arms 11 and 12.

Figure 2:
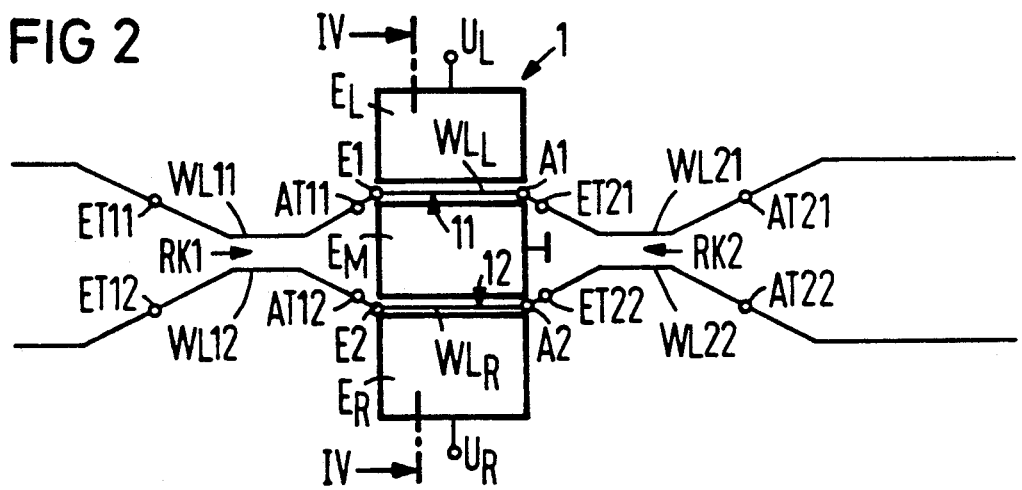
FIG. 2 is a plan view of a first embodiment of an apparatus constructed in accordance with the principles of the present invention having a directional coupler at the input side and directional coupler at the output side.

A first exemplary embodiment of an apparatus constructed in accordance with the principles of the present invention is shown in FIG. 2 having an integrated optical interferometer corresponding to the classical optical structure of FIG. 1.

Figure 3:
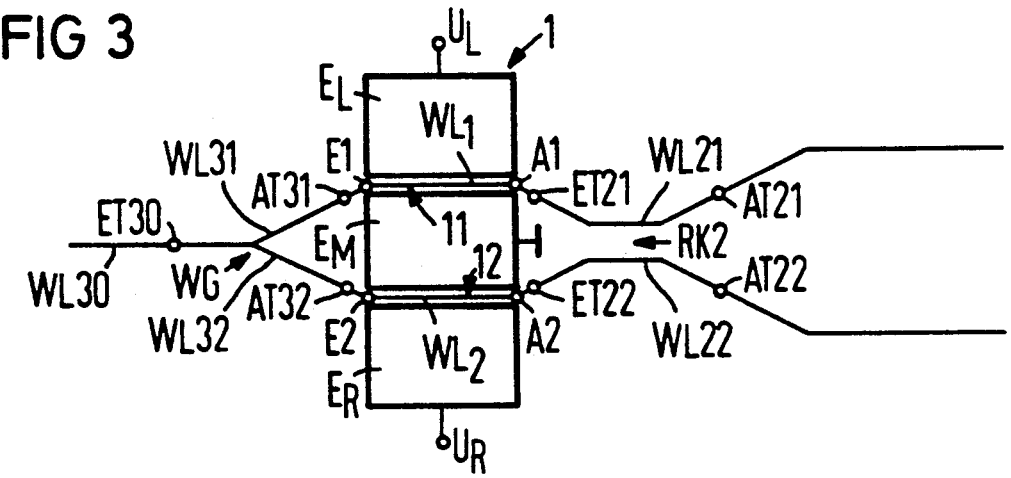
FIG. 3 is a plan view of a second embodiment of the apparatus constructed in accordance with the principles of the present invention having a waveguide fork at the input side and a directional coupler at the output side.

In the apparatus of FIG. 3, the interferometer arms 11 and 12 of the Mach-Zender interferometer 1 are formed by two optical waveguides $WL_L$ and $WL_R$ integrated on a substrate of electro-optical material. The phase differences $\Delta\phi_{TE}$ and $\Delta\phi_{TM}$ are effected by an electrical field which permeates the waveguides $WL_L$ and $WL_R$. This electrical field is generated by electrodes $E_L$, $E_M$ and $E_R$ arranged on or over a substrate to which voltages $U_L$, $U_O$ and $U_R$ can be applied.

The waveguides $WL_L$ and $WL_R$ can be formed by any material capable of modifying its refractive index based on an external stimulation, such as magneto-optical, elasto-optical of thermo-optical material. In these cases, the substrate is composed having a material exhibiting one of these effects, and a means is provided for modifying the refractive index of the waveguide by exploiting the particular effect.

A polarization-independent directional coupler RK1 is provided at the input side of the apparatus in FIG. 2, which corresponds to the beam splitter SSp1 at the input side of the structure of FIG. 1. The directional coupler RK1 is integrated on the substrate and, in a known manner, comprises two integrated optical waveguides WL11 and WL12 which define two input ports ET11 and ET12, and two output ports AT11 and AT12 of the directional coupler.

The output port AT11 is connected to an input E1 of the interferometer arm 11 and the output port AT12 is connected to an input E2 of the other interferometer arm 12.

An incoming optical wave coupled into the input port ET11 or the input port ET12 is divided into waves which are respectively supplied to the interferometer arms 11 and 12 via the output ports AT11 and AT12.

The directional coupler Rk1 is preferably a 3 dB directional coupler, because such a coupler is favorable with respect to the permissible tolerances in the coupling ratio.

The embodiment of FIG. 2 also includes another polarization-independent coupler RK2 at the output side, which corresponds to the beam splitter SSp2 in the structure of FIG. 1. The directional coupler RK2 is integrated on the substrate, and in a known manner consists of two integrated waveguides WL21 and WL22, which define two input ports ET21 and ET22, and two output ports AT21 and AT22.

The input port ET21 is connected to an output A1 of the interferometer arm 11 and the input port ET22 is coupled to an output port A2 of the other interferometer arm 12. Optical waves polarized orthogonally relative to each other can be taken from the output ports AT21 and AT22 of the directional coupler RK2 at the output side.

A second exemplary embodiment of the invention is shown in FIG. 3, which also corresponds to the classical optical structure shown in FIG. 1. The embodiment of FIG. 3 differs from the embodiment of FIG. 2 in that the directional coupler RK1 at the input side of the embodiment of FIG. 2 is replaced in the embodiment of FIG. 3 by a Y-shaped waveguide fork WG, which corresponds to the beam splitter SSp1 at the input side of the structure of FIG. 1.

The waveguide fork WG is integrated on the substrate, and comprises three integrated waveguide sections WL30, WL31 and WL32. The section WL30 defined an input port ET31, and the other sections WL31 and WL32 each define an output port AT31 or AT32 of the waveguide fork WG.

The output port AT31 is coupled to the input E1 of the interferometer arm and the output port AT32 is coupled to the input E2 of the other interferometer arm 12.

The waveguide fork WG divides an incoming optical wave coupled to the input port ET31 into waves which are respectively coupled into the interferometer arms 11 and 12.

The input ports and output ports defined for the purpose of discussion in connection with FIGS. 2 and 3 need not be physically present. For example the waveguides WL11, $WL_L$ and WL21, and the waveguides WL12, $WL_R$ and WL22, in the embodiment of FIG. 2 can each form a continuous waveguide train. The same is true for the waveguides forming the optical paths in the embodiment of FIG. 3.

Figure 4:
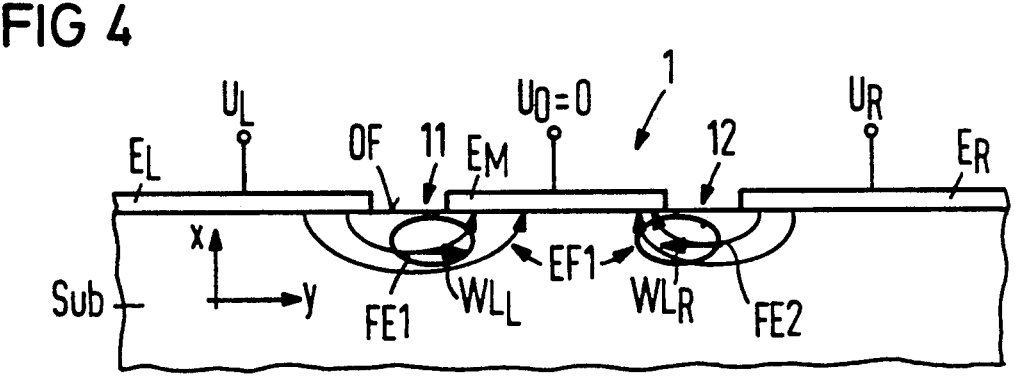
FIGS. 4 and 5 are respective cross-sections through the interferometer in the embodiment of FIG. 2 taken along line IV—IV of FIG. 2 showing operation in the presence of electric fields of different directions.
Figure 5:
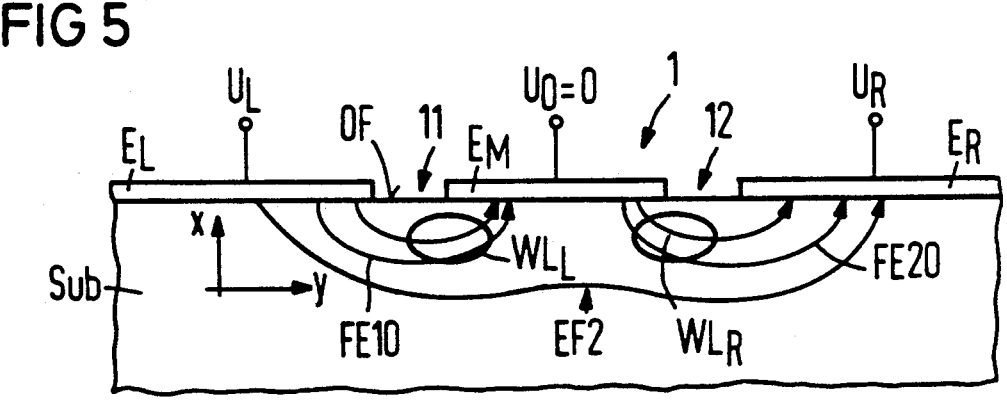

The details of operation of the apparatus shall be described with reference to FIGS. 4 and 5, each of which shows a cross-section of a physical realization of the embodiment of FIG. 2, taken along section line IV—IV of the interferometer in the presence of different electrical fields. In FIGS. 4 and 5, the interferometer is integrated on a substrate Sub consisting of lithium niobate. The waveguides $WL_L$ and $WL_R$ of the interferometer arms 11 and 12 are situated on the surface OF of the substrate Sub. The electrodes $E_L$, $E_M$ and $E_R$ are arranged on or above the surface OF. Without representing a limitation on other possible arrangements, it is assumed for the purposes of discussion that the electrode $E_M$ arranged between the waveguides $WL_L$ and $WL_R$ is grounded, thus a voltage $U_O=0$ exists at this electrode. A voltage $U_L$ is applied to the electrode $E_L$ arranged to the left of the waveguide $WL_L$ and a voltage $U_R$ is applied to the electrode $E_R$ arranged to the right of the waveguide $WL_R$.

The crystal of lithium niobate comprising the substrate Sub is selected, for example, such that the z-axis is perpendicular to the surface OF and the y-axis is perpendicular to the propagation direction x of an optical wave guided into the waveguides $WL_L$ and $WL_R$.

A mirror-symmetric voltage distribution occurs at the electrodes $E_L$, $E_M$ and $E_R$ when $U_L=U_R$. Such a voltage distribution generates an electrical field EF1 having field lines FE1 and FE2 proceeding in the direction as indicated in FIG. 4.

An unsymmetrical voltage distribution occurs at the electrodes $E_L$, $E_M$ and $E_R$ when $U_L=-U_R$. Such a voltage distribution generates an electrical field EF2 having field lines FE10 and FE20 proceeding in the direction as indicated in FIG. 5.

Any arbitrary voltage distribution can be obtained by varying the magnitude and sign of $U_L$ and $U_R$, which will be the result of a super positioning of a symmetric and nonsymmetric voltage distribution.

The various embodiments of the apparatus shown in FIGS. 2 through 5 operate such that the directional coupler RK1 (or the waveguide fork WG) at the input side uniformly divides the incoming optical wave into two portions, each of which is supplied to an interferometer arm 11 or 12. An electrical field in the substrate Sub is generated in the region of the electrodes $E_L$ and $E_R$. Due to the electro-optical effect (in this embodiment), this electrical field causes a refractive index change $\Delta n_{TE}$ for a TE-polarized wave and a refractive index change $\Delta n_{TM}$ for a TM-polarized wave between the two waveguides $WL_L$ and $WL_R$. The change $\Delta n_{TE}$ is proportional to C1 $(U_L+U_R)$+C2 $(U_L-U_R)$, where C1 and C2 are defined constants, and the change $\Delta n_{TM}$ is proportional to $U_L-U_R$.

When $U_L+U_R$ is selected so that a suitable phase difference between the divided portions of the incoming TE-polarized optical wave respectively supplied to the interferometer arms 11 and 12 is achieved, the TE-polarized wave complete couples into an output port AT21 or AT22 of the directional coupler RK2 at the output side. Similarly, when $U_L-U_R$ is selected so that a suitable phase difference between the divided portions of the incoming TM-polarized wave guided in the interferometer arms 11 and 12 is achieved, a TM-polarized wave completely couples into the other output port AT22 or AT21 of the directional coupler RK2 at the output side.

Figure 6:
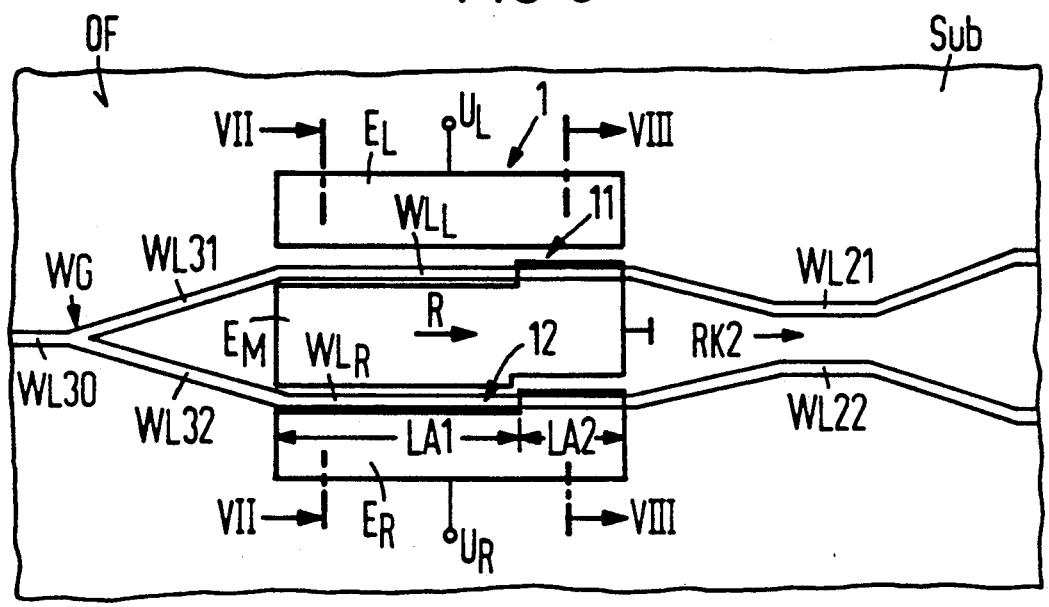
FIG. 6 is a plan view of the interferometer of the embodiment of FIG. 3 showing further structural details.
Figure 7:
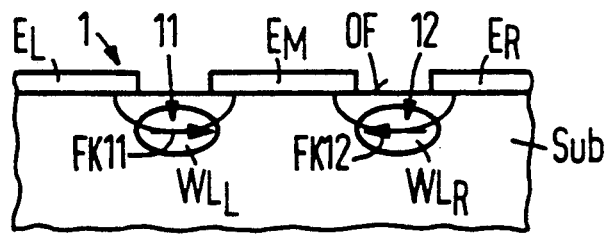
FIG. 7 is a cross-section through the interferometer of FIG. 6 taken along line VII—VII.
Figure 8:
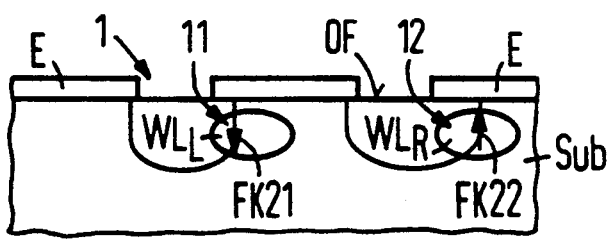
FIG. 8 is a cross-sectional view through the interferometer of FIG. 6 taken along line VIII—VIII.

A physical realization of the embodiment of FIG. 3 integrated on a substrate Sub is shown in FIG. 6. In the structural realization of FIG. 6, the electrode $E_R$ proceeds next to the waveguide $WL_R$ along a first longitudinal section LA1 of the waveguide $WL_R$, and the electrode $E_R$ overlaps the waveguide $WL_R$ along a second longitudinal section LA2 of the waveguide $WL_R$. Similarly, the middle electrode $E_M$ proceeds next to the waveguide $WL_L$ along a first longitudinal section, and overlaps the waveguide $WL_L$ along a second longitudinal section. This results in the horizontal components FK11 and FK12 of the electrical field being predominant in the waveguides $WL_L$ and $WL_R$ in the respective first longitudinal sections LA1 of those waveguides and being optically superimposed with the near field of the optical waveguided in those waveguides, as schematically indicated in FIG. 7. As shown in FIG. 8, the vertical components FK21 and FK22 of the electrical field predominant in the second longitudinal section LA2 of the waveguides $WL_L$ and $WL_R$ and optically overlap with the near field of the optical wave guided in those waveguides.

Although modifications and changes may be suggested by those skilled in the art it is the intention of the inventors to embody within the patent warranted hereon all changes and modifications as reasonably and properly come within the scope of their contribution to the art.

We claim as our invention:

1. An apparatus for generating optical waves, polarized orthogonally relative to each other, from an incoming optical wave having components in first and second polarization directions, said apparatus comprising:

an integrated Mach-Zender interferometer having two arms into which said incoming wave is guided by a means for coupling said incoming optical wave into said interferometer arms, said two arms in combination including means for phase shifting each of said components of said optical wave by a selected amount for generating a phase difference in each of said polarization directions between said components of said optical waves in the respective interferometer arms;

an integrated optical directional coupler having two input ports and two outputs ports, said input ports being respectively coupled to outputs of said interferometer arms for coupling said optical waves out of said interferometer with optical waves polarized in said first polarization direction being present at one of said output ports and optical waves polarized in said second polarization direction being present at the other of said output ports; and means for superimposing the optical waves coupled out of said interferometer.

2. An apparatus as claimed in 1, wherein each of said interferometer arms is an integrated optical waveguide consisting of a material having a refractive index which is variable by an external stimulus, and wherein said apparatus further comprises means for supplying said external stimulus to each interferometer arm.

3. An apparatus as claimed in claim 2, wherein each of said interferometer arms has longitudinal axis in the direction of propagation of the optical wave through the waveguide, and wherein said apparatus further comprises means for dividing each of said interferometer arms into a first longitudinal section in which said external stimulus has a predominant component in a first stimulus direction and into a second longitudinal section in which said external stimulus has a predominant component in a second stimulus direction, each of said first and second predominant stimulus components penetrating said interferometer arms.

4. An apparatus as claimed in 1, wherein each interferometer arm is an integrated optical waveguide consisting of a material having a refractive index which is variable dependent upon the direction of an electrical field, said apparatus further comprising means for generating an electrical field in which said interferometer arms are disposed.

5. An apparatus as claimed in claim 4, wherein said means for dividing is a means for dividing each of said waveguides into a first longitudinal section in which said electric field has a predominant component in the same direction as said first polarization direction and into a second longitudinal section in which said electric field has a predominant component in the same direction as said second polarization direction.

6. An apparatus as claimed in claim 4, wherein said waveguide is integrated on a substrate, and wherein said means for generating said electric field comprises a plurality of electrodes on said substrate.

7. An apparatus as claimed in claim 6, wherein said plurality of electrodes includes first, second and third electrodes, with one of said waveguides being integrated between said first and second electrodes, and the other of said waveguides being integrated between said second and third electrodes.

8. An apparatus as claimed in claim 7, wherein said means for dividing the waveguides between said first and second electrodes into said first and second longitudinal sections is a projection on one of said first or second electrodes extending over the waveguide and wherein the means for dividing the waveguide between said second and third electrodes into said first and second longitudinal sections is a projection on one of said second or third electrodes extending over the waveguide.

9. An apparatus as claimed in claim 1, wherein each of said interferometer arms is an integrated optical waveguide consisting of electro-optical material having a refractive index which is variable dependent upon the direction of an electrical field, each of said waveguides having a longitudinal axis in the direction of propagation of an optical wave through the waveguide, and said apparatus further comprising:
means for generating an electric field in which said waveguides are disposed; and
means for dividing each of said waveguides into a first longitudinal section in which said electric field has a predominant component in a first field direction and into a second longitudinal section in which said electric field has a predominant component in a second field direction, said first and second predominant field components penetrating said waveguides.

10. An apparatus as claimed in claim 1, wherein said means for coupling said incoming optical wave into said interferometer is an integrated optical directional coupler having an input side with two input ports and an output side with two output ports, said output ports being respectively coupled to said interferometer arms, and said incoming optical wave being coupled to one of said input ports.

11. An apparatus as claimed in claim 10, wherein said directional coupler is a 3 dB directional coupler.

12. An apparatus as claimed in claim 1, wherein said means for coupling said incoming wave into said interferometer is an integrated optical waveguide fork having an input port and two output ports, said output ports being respectively coupled to said interferometer arms and said incoming optical wave being coupled to said input port.

13. An apparatus as claimed in claim 1, wherein said directional coupler is a 3 dB directional coupler.

14. An apparatus for generating optical waves polarized orthogonally relative to each other from an incoming optical wave having components in first and second polarization directions, said apparatus comprising:
an integrated Mach-Zender interferometer having a first interferometer arm formed by a first waveguide integrated on a substrate and a second interferometer arm formed by a second waveguide integrated on said substrate, each of said first and second waveguides having an input and an output;
means for coupling said incoming optical wave into said inputs of said first and second waveguides;
said first and second waveguides in combination forming means for phase shifting each of said components of said incoming optical wave by a selected amount for generating a phase difference in each of said polarization directions between said components of said optical waves in the respective interferometer arms; and
a directional coupler having inputs respectively connected to the outputs of said waveguides, and having outputs at which optical waves respectively polarized orthogonally relative to each other are present.

15. An apparatus as claimed in claim 14, wherein said means for coupling said incoming optical wave into said waveguides is a directional coupler having two input ports to which said incoming optical wave is coupled, and two output ports respectively connected to said inputs of said waveguides.

16. An apparatus as claimed in claim 14, wherein said means for coupling said incoming optical wave into said waveguides is a waveguide fork having an input to which said incoming optical wave is coupled, and having outputs respectively coupled to said inputs of said waveguides.

17. An apparatus for generating optical waves polarized orthogonally relative to each other from an incoming optical wave having components in first and second polarization directions, said apparatus comprising:
a substrate;
a Mach-Zender interferometer having a first arm formed by a first waveguide integrated on said substrate and a second arm formed by a second waveguide integrated on said substrate, each of said first and second waveguide shaving a longitudinal axis in a direction of propagation of optical waves through the waveguide, and each of said first and second waveguides consisting of electro-optical material having a refractive index which is variable dependent upon the direction of an electric field;
means for coupling said incoming optical wave into each of said first and second waveguides;
first, second and third electrodes integrated on said substrate, said first and second electrodes being integrated on said substrate on opposite sides of said first waveguide and said second and third electrodes being integrated on said substrate on opposite sides of said second waveguide, said first, second and third electrodes being adapted for connection to a voltage supply to generate an electric field having components transverse to said longitudinal axes of said first and second waveguides thereby to modify the refractive index of each of said waveguides to effect a phase shift in each of said components of said optical waves in said waveguides to generate a phase difference in each of said polarization directions between said components of said optical waves in the respective interferometer arms; and an integrated optical directional coupler having two input ports and two output ports, said input ports being respectively coupled to outputs of said first and second waveguides for coupling said optical waves out of said interferometer with optical waves polarized in said first polarization direction being present at one of said output ports and optical waves polarized in said second direction being present at the other of said output ports.

18. An apparatus as claimed in claim 17, further comprising:
a projection on said second electrode extending over a portion of said first waveguide to divide said first waveguide into a first longitudinal section in which said electric field has a predominant component in a first direction and into a second longitudinal section in which said electric field has a predominant component in a second direction; and
a projection on said third electrode extending over a portion of said second waveguide to divide said second waveguide into a first longitudinal section in which said electric field has a predominant component in a first direction and into a second longitudinal section in which said electric field has a predominant component in a second direction, each of said predominant components in said first and second directions penetrating said first and second waveguides.

* * * * *